United States Patent [19]

Schmidt

[11] Patent Number: 5,238,454

[45] Date of Patent: Aug. 24, 1993

[54] ONE-PIECE FLEXIBLE COUPLING HAVING A PLURALITY OF AXIALLY SPACED DISKS

[75] Inventor: Horst Schmidt, Windsor, Canada

[73] Assignee: Build-A-Mold Limited, Canada

[21] Appl. No.: 713,425

[22] Filed: Jun. 10, 1991

[51] Int. Cl.$^5$ ............................................... F16D 3/78
[52] U.S. Cl. ......................................... 464/99; 464/87; 464/96
[58] Field of Search ............... 464/78, 81, 85, 87, 464/92, 98, 99, 106, 147, 96; 254/323

[56] References Cited

U.S. PATENT DOCUMENTS

| | | | |
|---|---|---|---|
| 326,941 | 9/1885 | Browne | 464/99 X |
| 1,557,958 | 10/1925 | Anderson | 464/78 |
| 3,071,942 | 1/1963 | Alcaro | 464/78 |
| 3,844,137 | 10/1974 | Zugel | 464/78 |
| 4,203,304 | 5/1980 | Decker | 464/99 |
| 4,214,458 | 7/1980 | Philleo | 464/85 |
| 4,449,955 | 5/1984 | Watanabe et al. | 464/87 X |
| 4,634,399 | 1/1987 | Brunsch et al. | 464/87 |
| 4,690,661 | 9/1987 | Fredericks et al. | 464/78 |
| 5,041,060 | 8/1991 | Hendershot | 464/99 X |

FOREIGN PATENT DOCUMENTS

| | | | |
|---|---|---|---|
| 424686 | 4/1974 | U.S.S.R. | 464/99 |
| 489018 | 10/1936 | United Kingdom | 464/99 |

Primary Examiner—Daniel P. Stodola
Assistant Examiner—William G. Battista, Jr.
Attorney, Agent, or Firm—Howard & Howard

[57] ABSTRACT

A one-piece flexible coupling is integrally molded from plastic. A plurality of discs are connected by posts over small circumferential extents with slots formed over the remainder of the circumferential extent of the discs. The posts between adjacent discs are offset by 90° from the previous and subsequent discs. Shafts are connected at both ends of the flexible coupling, and the flexible coupling transmit rotation between the shafts, even when they are at non-parallel angles relative to each other.

7 Claims, 2 Drawing Sheets

ONE-PIECE FLEXIBLE COUPLING HAVING A PLURALITY OF AXIALLY SPACED DISKS

BACKGROUND OF THE INVENTION

This application in general relates to a one-piece flexible coupling for connecting two rotating shafts.

Couplings are known which connect two rotating shafts such that the axes of rotations of the two shafts may vary with respect to each other. Such couplings will be defined as "flexible" couplings for the purpose of this application.

In one prior art flexible coupling, a plurality of members are spaced axially between adjacent ends of two rotatable shafts. The shafts are connected to respective end members, and the end members are connected to adjacent members by rivets. One end member is defined as a first member, and the adjacent member is defined as a second member. The first and second members are connected by two rivets spaced 180° from each other. The second and third members are also connected by two rivets which are spaced 180° from each other, and offset 90° from the rivets in the first and second members. The third and fourth members are connected by two rivets which are aligned in the same position as the rivets connecting the first and second members. If additional members are included, the fourth and fifth members have rivets positioned as on the second and third members. Any subsequent members are connected by rivets repeating this pattern.

This coupling has proven relatively successful in transmitting rotation between two shafts, but some drawbacks exist. First, the connection of the rivets to the members create weakened points which may tear while the coupling transmits rotation. Further, the use of rivets to connect the members increase the complexity of the assembly and also results in a relatively noisy coupling.

One-piece flexible couplings are known, however, such couplings are typically hollow cylindrical members. These couplings do not always transmit adequate torque.

It is an object of the present invention to disclose a one-piece coupling which is molded from plastic, and incorporates both solid discs and the disc connectors as a single one-piece unit.

SUMMARY OF THE INVENTION

In an embodiment of the present invention a one-piece flexible coupling is molded from plastic. Solid cylindrical discs are axially spaced between two shaft connector portions. The discs are spaced by slots which extend over the majority of the circumference of the discs. Adjacent discs are connected to each other over a small circumferential extent by connecting posts. The posts connecting the first and second discs include two relatively small sections which are spaced by 180° from each other. Connecting posts which connect the second and third discs are also spaced by 180° from each other, and are offset 90° from the connecting posts connecting the first and second discs. The third and fourth discs are connected by connecting posts which are positioned similar to the posts connecting the first and second discs. Fourth and fifth discs are connected by posts which are positioned similar to the posts connecting the second and third discs. If there are further discs, the pattern is repeated. The spacing between adjacent discs is relatively thin in comparison to the thickness of the discs, and defines the slots which allow the discs to flex about the posts, and transmit rotation between two shafts at non-parallel angles with respect to each other.

Since the coupling is a one-piece item there are no rivet joints which create a weakened breaking point. The solid cylindrical discs ensure coupling stability and adequate torque transmission. Further, the coupling is relatively simple to manufacture and assemble and is quiet in operation.

In one disclosed embodiment, a wheel-lift mechanism utilizes the one-piece coupling to transmit rotation from a first rotating shaft to a device for lifting and lowering a tire beneath a vehicle body. It should be understood that this is only one preferred use of the disclosed one-piece joint, and is not limiting on the present invention.

These and other objects and features of the present invention are best understood from the following specification and drawings, of which the following is a brief description.

DETAILED DESCRIPTION OF A PREFERRED EMBODIMENT

Figure 1:
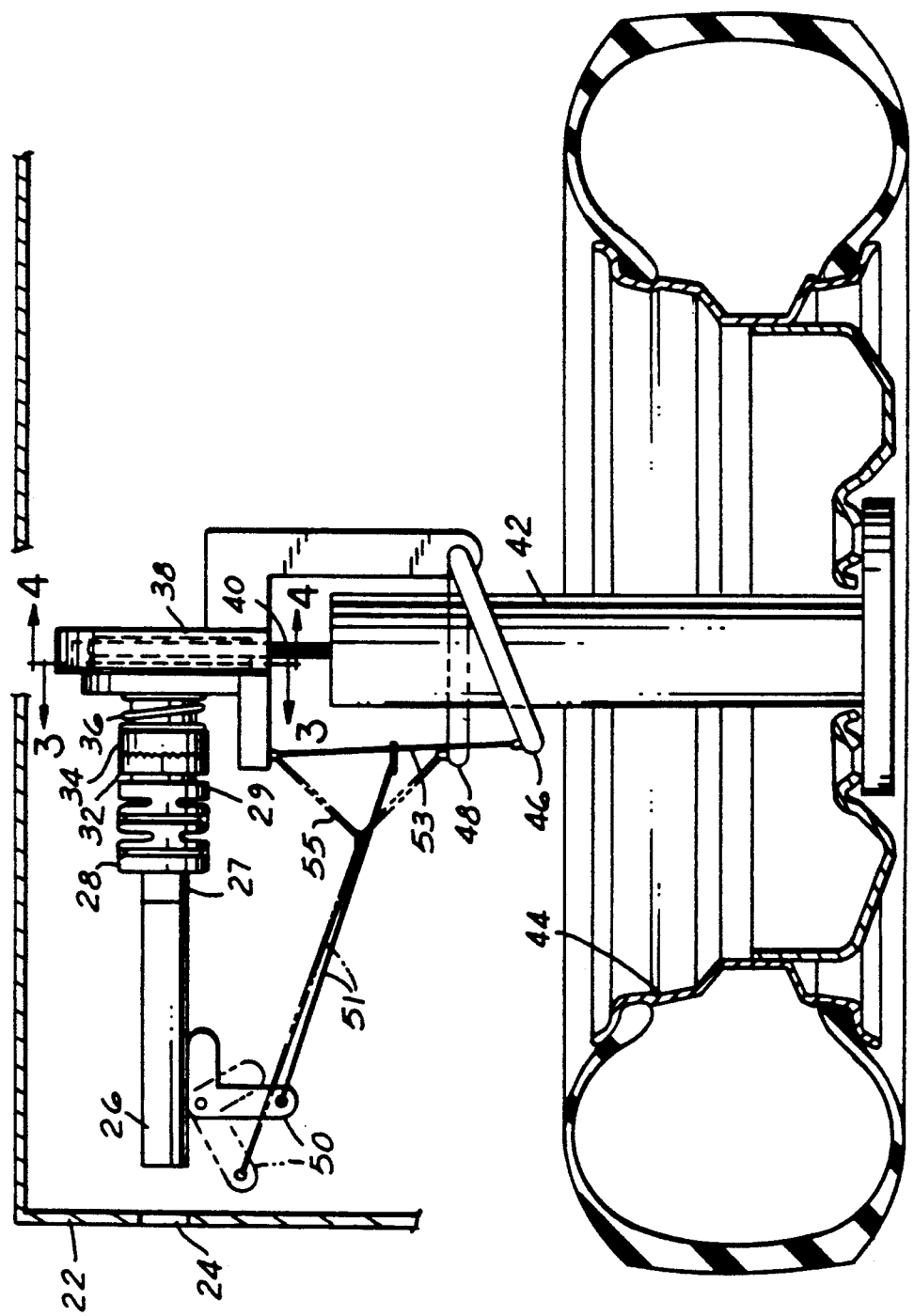
FIG. 1 is a largely schematic view of a wheel-lift system incorporating the inventive coupling.

As illustrated in FIG. 1, wheel-lift system 20 is mounted beneath vehicle body 22. Access hole 24 extends through the rear of vehicle body 22. Hole 24 may typically extend through bumper of a van or similar vehicle. The size of vehicle body 22 relative to the size of wheel-lift system 20 is reduced to better illustrate the components of wheel-lift system 20.

Wheel-lift system 20 includes first shaft 26 connected to shaft connector 27 at one end of a one-piece flexible coupling 28. A similar shaft connector 29 is connected to first toothed member 32, which is engaged with a second toothed member 34. Toothed member 34 is biased by spring 36 into toothed member 32, and provides a torque limiting structure. Should the force between members 32 and 34 overcome the force of spring 38, member 34 moves out of mesh with member 32, and drive is no longer transmitted. Toothed member 34 drives a rotary transmission within housing 38, which raises and lowers cable 40. One end of cable 40 is fixed in tee 42, which is received in the hub 44 of a tire. By raising and lowering cable 40 one may raise and lower the tire.

Lock member 46 is normally pivoted to an angle which is non-perpendicular to the axis of tee 42. An aperture in lock member 46 is received on tee 42. When lock member 46 is in this position, it grips tee 42 and provides an override lock, preventing lowering of the tire should cable 40 break, or be inadvertently lowered. When lock member 46 is pivoted to a release position, shown in phantom 48, the aperture no longer grips the outer periphery of tee 42 and the tire can be lowered. Pivot member 50 is pivoted to pull cable 51 which pulls a second cable 53 to a release position 55, shown in phantom, which in turn moves lock member 46 to released position 48.

To operate system 20, an implement is inserted through hole 24 and into shaft 26. Shaft 26 is pivoted downwardly as shown in this figure, and lever 50 pivots forwardly such that lock member 46 is moved to phantom position 48. Shaft 26 may then be turned such that cable 40 and tire hub 44 are lowered to the ground. System 20 is the subject of co-pending application Ser. No. 07/713,427, entitled "Wheel-Lift Mechanism", and invented by the inventor of this application.

Figure 2:
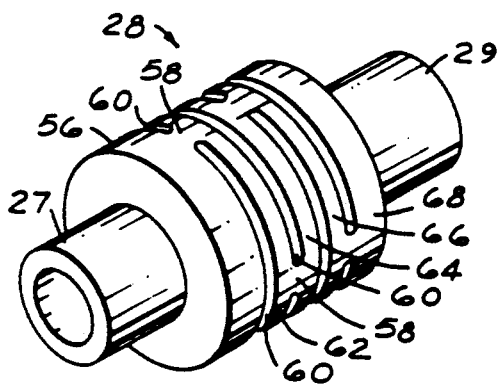
FIG. 2 is a perspective view of the inventive coupling.

One-piece coupling 28 is illustrated in FIG. 2. First shaft connector 27 is formed at one end, while second shaft connector 29 is formed at the other end. First disc 56 is formed integrally with shaft connector 27 and a connection post 58 connects first disc 56 to a second disc 62. Slots 60 are formed between discs 56 and 62 on each circumferential side of post 58. Similarly, posts 58 and slots 60 are formed between second disc 62 and a third disc 64. Two posts 58 are preferably formed between each pair of discs, although only one is illustrated. Posts 58 between first disc 56 and second disc 62 are offset 90° from the posts between second disc 62 and the third disc 64. Posts 58 and slots 60 are also formed between third disc 64 and a fourth disc 66. Posts 58 are positioned similar to those between first disc 66 and second disc 62. A fourth disc 66 is connected to fifth disc 68 through posts 58 which are positioned similar to that between second and third discs 62, 64.

When a shaft connected to shaft connector 27 is pivoted relative to the remainder of coupling 28, such as would happen in the system shown in FIG. 1 when shaft 26 is pivoted downwardly, rotation is still transmitted from shaft connector 27 to shaft connector 29. Slots 60 allows discs to flex about posts 58 and take up the difference in the angles between the connectors 27 and 29. Torque can still be transmitted through coupling 28 such that devices connected to connector 29 can still be powered.

Although coupling 28 is shown in system 20 in FIG. 1, it should be understood that this is not limiting on its uses. Shaft coupling 28 may be utilized in any environment where it is desired to have a flexible coupling that transmits rotation between two shafts which may sometimes be non-parallel relative to each other. Shaft coupling 28 is preferably molded as a one-piece item, and is thus relatively simple to manufacture and construct, and operates relatively quietly.

The discs are preferably solid cylinders, the posts are preferably cylindrical and the connectors are preferably hollow. Such shapes optimize torque transfer and flexibility.

In designing shaft 28, one may vary the cross-sectional area of posts 58, and the thickness of the discs to increase the ability to transmit torque. Further, the length of posts 58, which is equal to the spacing between the discs, may be varied. Generally, the greater the area of posts 58 or the thickness of the discs, the greater the torque that can be transmitted. The length of the post has the opposite effect. As this ability to transmit torque increases, the ability to transmit rotation at distinct angles, or the flexibility of the coupling, decreases. Shear equations are commonly known for determining the torque a coupling will transmit without failure.

Figure 3:
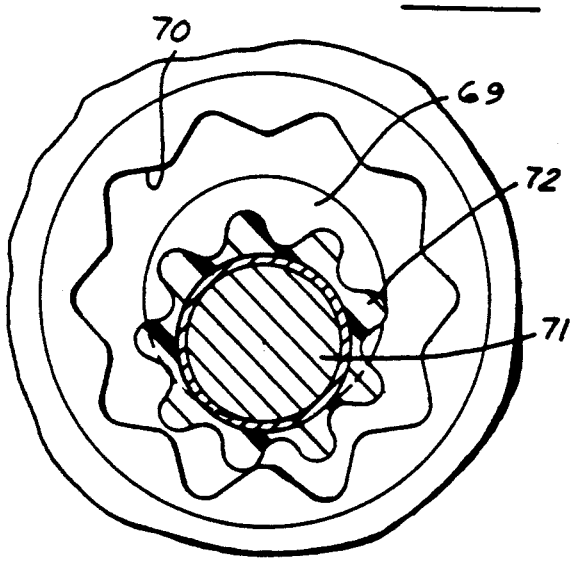
FIG. 3 is a cross-sectional view along line 3—3 as shown in FIG. 1.
Figure 4:
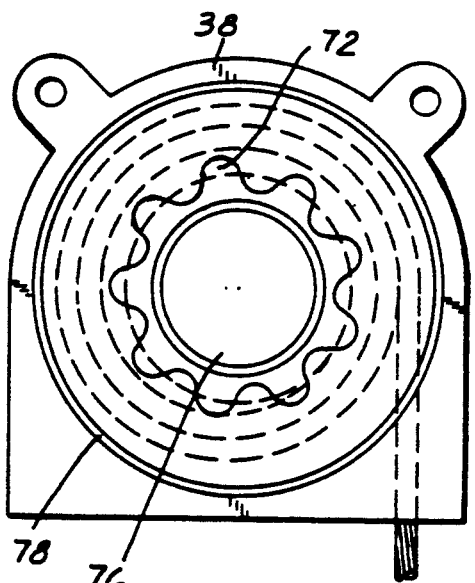
FIG. 4 is a cross-sectional view along line 4—4 as shown in FIG. 1.
Figure 5:
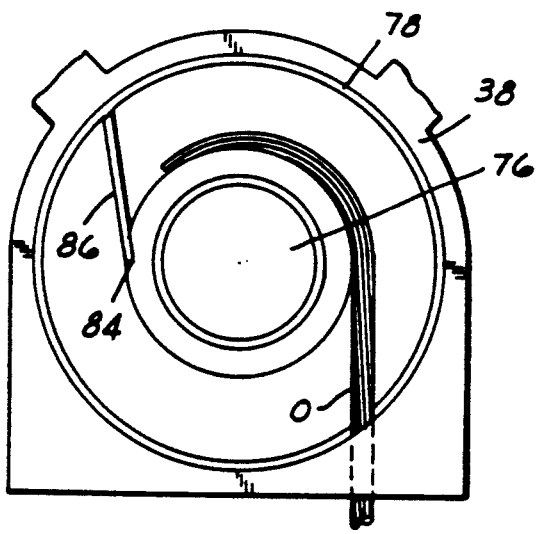
FIG. 5 is a view similar to FIG. 4, but after the tire has been lowered.

FIGS. 3 through 5 show further details of the system shown in FIG. 1. Again, coupling 28 may be utilized in any system, however, it is disclosed here in system 20 such that its utility in one system may be clearly appreciated.

FIG. 3 is a view along line 3—3 as shown in FIG. 1. When toothed gear 34 is rotated by toothed gear 32, see FIG. 1, it rotates shaft 69. An internally toothed gear 70 is fixed and an integral part of housing 38. Shaft 69 has an eccentric shaft 71 which receives an externally toothed gear 72. Gear 72 is fixed to rotate with a reel within housing 38, as will be described below. When shaft 69 rotates it rotates eccentric 71, which moves gear 72 along gear 70, causing gear 72 to counterrotate about shaft 71. By varying the relative number of teeth on gears 70 and 72, one controls the ratio between the input and output for driving the reel within housing 38.

FIG. 4 is a view along line 4—4 and shows shaft 76 which is integrally attached to shaft 71. Gear 72 is fixed to a face of reel 78, and reel 78 moved with gear 72 as it walks along gear 70. Cable 80 is received on reel 78 and within housing 38.

When toothed gear 34 rotates, it rotates shaft 71, which moves gear 72 and the integral reel 78. Cable 80 is moved into or out of housing 38. In this way wheel hub 44 may be raised and lowered.

As shown in FIG. 5, one end 82 of cable 80 is fixed to an inner portion of reel 82. Spring finger 86 is biased radially inwardly relative to shaft 76 and catches notch 84 in reel 78 once all the cable 80 has moved off of reel 78. Finger 86 locks in notch 84, such that reel 78 cannot be rotated any further. This defines a stop, preventing further lowering of cable 80.

It is preferred that the one-piece flexible coupling be injection molded. The mold body would preferably have structure to form the discs, posts 58, slots 60, and shaft connectors 27 and 29. By cooling the shaft connectors 27 and 29 quicker than the discs or posts, the shaft couplings will become more rigid.

The cable is preferably braided steel, stainless steel, or a strong fiber. The other members are all preferably formed from a suitable plastic.

In one preferred embodiment of the present invention coupling 28 had 6 spaced discs. The discs were 0.50 inches in axial length, and 1.5 inches in diameter. Slots 60 between the adjacent discs were 0.6 inches in length. Posts 58 were cylinders that were 0.25 inches in diameter. The joint is preferably formed of a nylon, and preferably one available under the trade name Nylon 6/6.

Although coupling 28 is preferably injection molded, with mold body portions forming slots 60 and posts 58, it should be understood that other ways of forming coupling 28 may be utilized. As an example, coupling 28 could be molded as a one-piece cylindrical item without slots 60. Slots 60 could then be cut into the cylindrical body. Although coupling 28 is preferably formed from plastic, other polymers such as molded rubber may be used.

A preferred embodiment of the present invention has been disclosed, however, a worker of ordinary skill in the art would recognize that certain modifications would come within the scope of this invention. For that reason the following claims should be studied in order to determine the true scope and content of the invention.

I claim:

1. A shaft coupling comprising:
   a first and a second shaft connector and both centered on a central axis and spaced axially from each other;

a plurality of solid cylindrical discs spaced between said first and second shaft connectors, a first disc being defined as the disc most adjacent said first shaft connector, and a second disc being the next adjacent disc in a direction towards said second shaft connector, said first shaft connector being integral with said first disc;

said first disc being connected to said second disc by a post extending at each of two circumferentially spaced positions about said central axis, there being slots formed between said first and second discs over the remainder of their circumferential extends;

said second disc and a third disc being connected by a post extending at each of two circumferentially spaced positions about said central axis, there also being slots between said second and third discs over the remainder of their circumferential extents, said post between said first and second discs being circumferentially offset by 90° relative to said posts between said second and third discs; and said discs, said shaft connectors, and said posts being integrally formed of a polymer.

2. The coupling as recited in claim 1, wherein there are n discs, said third disc and a fourth disc being connected by posts positioned at the identical circumferential positions as said posts connecting said first and second discs, this pattern repeating until the nth disc, said nth disc being at said second shaft connector.

3. The coupling as recited in claim 1, wherein said posts between each adjacent discs are spaced by 180° from each other.

4. The coupling as recited in claim 1, wherein said slots between adjacent discs extend for a greater axial distance than said discs.

5. The coupling as recited in claim 1, wherein said polymer is a plastic.

6. The coupling as recited in claim 5, wherein said plastic is molded as a one-piece item.

7. The coupling as recited in claim 1, wherein said posts are circular in cross-section.

* * * * *